United States Patent
Fireaizen (10) Patent No.: US 12,055,645 B2
(45) Date of Patent: Aug. 6, 2024

(54) SYSTEM AND METHOD FOR POSITIONING AND NAVIGATION OF AN OBJECT

(71) Applicant: Elta Systems Ltd., Ashdod (IL)

(72) Inventor: Moshe Fireaizen, Kfar Saba (IL)

(73) Assignee: ELTA SYSTEMS LTD., Ashdod (IL)

(*) Notice: Subject to any disclaimer, the term of this patent is extended or adjusted under 35 U.S.C. 154(b) by 143 days.

(21) Appl. No.: 17/772,342

(22) PCT Filed: Dec. 6, 2020

(86) PCT No.: PCT/IL2020/051258
§ 371 (c)(1),
(2) Date: Apr. 27, 2022

(87) PCT Pub. No.: WO2021/117032
PCT Pub. Date: Jun. 17, 2021

(65) Prior Publication Data
US 2022/0381926 A1    Dec. 1, 2022

(30) Foreign Application Priority Data
Dec. 12, 2019    (IL) ......................................... 271423

(51) Int. Cl.
*G01S 19/47*    (2010.01)
*G01S 19/24*    (2010.01)
*G01S 19/43*    (2010.01)

(52) U.S. Cl.
CPC .............. *G01S 19/47* (2013.01); *G01S 19/24* (2013.01); *G01S 19/43* (2013.01)

(58) Field of Classification Search
CPC .......... G01S 19/47; G01S 19/24; G01S 19/43; G01S 5/14; G01S 5/0226; G01S 19/11
See application file for complete search history.

(56) References Cited

U.S. PATENT DOCUMENTS

| | | | |
|---|---|---|---|
| 7,139,583 B2 | 11/2006 | Yamasaki et al. | |
| 7,340,343 B2 | 3/2008 | Petrovski et al. | |
| 9,658,309 B2 | 5/2017 | Amendolare et al. | |
| 11,531,117 B1* | 12/2022 | Brashar | G01S 19/47 |
| 2004/0021603 A1 | 2/2004 | Zimmerman et al. | |
| 2006/0061691 A1* | 3/2006 | Rabinowitz | H04N 21/658 |
| | | | 725/62 |

(Continued)

FOREIGN PATENT DOCUMENTS

DE    102004043524 A1    5/2005

*Primary Examiner* — Keith D Bloomquist
(74) *Attorney, Agent, or Firm* — BROWDY AND NEIMARK, P.L.L.C.

(57) ABSTRACT

A positioning system and method for determination of location data of an object are described. The positioning system includes one or more transmitting units configured to transmit a multi-frequency signal that comprises at least two different signal frequency components. The positioning system also includes a receiver system mounted on the object, and configured to receive the multi-frequency signals from the transmitting units, and to determine phases of each signal frequency component of the multi-frequency signal. The positioning system also includes a processing system configured to receive the phases of each signal frequency component of the multi-frequency signal, and to determine a distance between the transmitting units and the object, and the location data of the object.

18 Claims, 2 Drawing Sheets

(56) References Cited

U.S. PATENT DOCUMENTS

| | | | |
|---|---|---|---|
| 2011/0208481 A1* | 8/2011 | Slastion | G01S 3/74 |
| | | | 702/189 |
| 2012/0013509 A1* | 1/2012 | Wisherd | G01S 5/06 |
| | | | 342/451 |
| 2014/0185464 A1* | 7/2014 | Yang | G01S 11/06 |
| | | | 370/252 |
| 2014/0274131 A1* | 9/2014 | Zhang | G01S 5/0018 |
| | | | 455/456.2 |
| 2016/0157201 A1* | 6/2016 | Silverman | H04W 64/00 |
| | | | 455/456.1 |
| 2016/0249201 A1* | 8/2016 | Zhang | H04W 48/16 |
| 2016/0327370 A1* | 11/2016 | Holder | G01S 13/003 |
| 2020/0000366 A1* | 1/2020 | Katabi | G01S 13/765 |
| 2020/0319347 A1* | 10/2020 | Faragher | G01S 19/26 |
| 2020/0322752 A1* | 10/2020 | Eggert | H04L 9/3215 |

* cited by examiner

Fig. 3

SYSTEM AND METHOD FOR POSITIONING AND NAVIGATION OF AN OBJECT

TECHNOLOGICAL FIELD

The present invention relates to positioning and navigating techniques, and more particularly to a technique for determining location data of an object carrying a receiver on board, which receives signals from transmitters.

BACKGROUND

Determining location and respective spatial coordinates of static or moving objects is important in various applications, which provide navigation and location-based service to a user.

Conventional techniques, such as global positioning systems (GPS), are known for providing data indicative of location of an object. GPS services can also be used for providing spatial coordinates of the object, so as to navigate the user to a desired destination. A typical GPS setup may include a GPS receiver, that can, for example, be integrated in a hand-held electronic device or mounted on a vehicle, and corresponding software communicating with the GPS receiver. The software is configured to receive data on the location of the user associated with the GPS receiver, and to process these data in order to direct the user to a desired location.

Operation of GPS systems is based on relative position of the GPS specialized satellites, and on time data provided from accurate and synchronized clocks associated with the GPS receiver and the corresponding GPS specialized satellites. Each such satellite continuously transmits a radio signal (carrier wave with appropriate modulation) containing time and location data indicative of its position. The GPS receiver utilizes these data to determine its precise position.

GENERAL DESCRIPTION

Although conventional GPS based techniques are currently widely used, these techniques suffer from evident drawbacks related to limited accuracy in determining position of the GPS receiver. These accuracy issues arise since the ionosphere and the troposphere can slow down the rate of signal propagation. Weather conditions and electromagnetic interference can also affect data transmission. These drawbacks may impose severe difficulties on attaining accurate measurements of an object, especially when such measurements involve high-velocity variations of the receiver's position, e.g. when the receiver is mounted on a drone.

Furthermore, conventional GPS techniques suffer from vulnerability to deception which may be caused by intentional signal jamming or signal blocking, stemming from the fact that GPS systems operate using predetermined RF frequencies utilized by GPS satellites. Additionally, when GPS signals arrive to the Earth's surface (where GPS receivers are typically located), they can be relatively weak, and the GPS receivers' sensitivity can be insufficient for accurate detection.

Thus, there is still a need in the art for, and it would be useful to have, a novel positioning and navigating technique providing accurate information on distance and position data of an object.

It would be advantageous to have a positioning system and method that operates independently of any external satellites, such as GPS satellites, thereby enhancing accuracy of the system.

It would also be advantageous to have a positioning system and method enabling determination of accurate position as well as kinematic data, e.g., velocity and acceleration of an object that moves at high-velocities.

It would be useful to have a further improvement of a positioning system so that it would be robust with respect to signal jamming and blocking, thereby enabling improved performance and operation of the system in hostile environments.

The present invention partially eliminates the deficiencies of existing GPS systems, and provides a novel positioning system and method for determining location data of an object. Generally, the location data may include spatial coordinates (e.g., Cartesian or any other coordinates) of the object.

According to an embodiment of the present invention, the system includes one or more transmitting units. Each transmitting unit is configured to transmit a multi-frequency signal. More specifically, each transmitting unit transmits a multi-frequency pulsed signal which includes at least two different signal frequency components. In this connection, the system of the present invention operates with a discrete set of signal frequency components which are selected by the user/operator of the system and therefore are not restricted by frequencies utilized in conventional GPS systems. Such a configuration enables operation in hostile environments in which signal jamming or signal blocking may impose difficulties for operation of the system.

The positioning system also includes a receiver system mounted on the object. The receiver system is configured and operable to receive multi-frequency signals provided by the transmitting units, and to determine phases of each signal frequency component of the multi-frequency signals.

The positioning system further includes a processing system which is in data communication with the receiver system. The processing system is configured to receive the phases of each signal frequency component of the multi-frequency signals, and to determine a distance D between the transmitting units and the object. The processing system can also be adapted for determining the location data of the object.

According to some embodiments of the present invention, the location data include K parameters defining a set of desired location parameters and a time parameter of the object. Specifically, the desired parameters include location coordinates x(t), y(t) and z(t) of the object at time t, and a system time T parameter. Accordingly, K can be selected from 1, 2, 3 and 4, depending on the number of the parameters which are desired to determine. In order to determine the desired number K of the parameters, the system should include K transmitting units. According to some embodiments of the present invention, the multi-frequency signal includes a sum of number L of signal frequency component $f_i$, where i is the number index of the signal frequency component. Preferably, but not mandatory, the signal frequency components $f_i$ are mutually prime numbers, namely the only integer that divides both of them is 1.

According to some embodiments of the present invention, the receiver is configured to receive multi-frequency signals provided by the transmitting units, to analyze the multi-frequency signals and to determine number L of the signal frequency components $f_i$ of each multi-frequency signal.

According to an embodiment of the present invention, the receiver system includes a time clock unit coupled to phase measuring unit for activation of measurements of the phases $\phi_i$ with a predetermined measurement rate (i.e., time interval of measurements) $T_s$. The measurements of the phases $\phi_i$ can be carried out with a predetermined measurement rate $T_s$ that can, for example, be in the range of 10 microseconds to 100 microseconds.

According to some embodiments of the present invention, the distance D between the transmitting unit and the object is determined by $D = c \Delta t$, where c is the light speed, and $\Delta t$ is the time of propagation of the multi-frequency signals between the transmitting unit and the receiver (mounted on the object).

According to an embodiment of the present invention, the time $\Delta t$ can be determined from the equation:

$$\Delta t = \frac{\phi_i + 2\pi N_i}{2\pi f_i}$$

where $\phi_i$ is the phase of an i-th signal frequency component determined by the receiver, and $N_i$ is a number of wave cycles of the i-th signal frequency component spanned on the distance D.

According to some embodiments of the present invention, the number i of the signal frequency component $f_i$ is selected from 0, 1, 2 and 3. In this case, the number of the signal frequency components $f_i$ transmitted by the at least one transmitting unit is four, i.e., $f_0$, $f_1$, $f_2$, and $f_3$.

According to some embodiments of the present invention, the processing system is configured for determining the number $N_0$ of cycles of the first signal frequency component $f_0$ by using any one of the equations:

$$N_0 = -\frac{f_0\phi_1 - f_1\phi_0 + 2\pi M_0 f_0}{2\pi(f_0 - f_1)}$$

$$N_0 = -\frac{f_0\phi_2 - f_2\phi_0 + 2\pi M_1 f_0}{2\pi(f_0 - f_2)}$$

and $$N_0 = -\frac{f_0\phi_3 - f_1\phi_0 + 2\pi M_2 f_0}{2\pi(f_0 - f_3)},$$

where $M_0$, $M_1$, and $M_2$ are additives to the number of cycles $N_0$ for the signal frequency components $f_1$, $f_2$, and $f_3$, correspondingly.

According to some embodiments of the present invention, the processing system is configured for determining $M_0$ and $M_1$ by using the following algorithm: for each $M_0$ selected from 0 to $(M_{0max}-1)$ and for each $M_1$ selected from 0 to $(M_{1max}-1)$, the processing system calculates integer numbers corresponding to $M_0$ and $M_1$ such that $M_0$ and $M_1$ satisfy the following equation:

$$\frac{f_0\phi_1 - f_1\phi_0 + 2\pi M_0 f_0}{f_0 - f_1} = \frac{f_0\phi_2 - f_2\phi_0 + 2\pi M_1 f_0}{f_0 - f_2},$$

where $M_{0max} = \text{round}[2\pi(f_1-f_0)T_s]$ and where $M_{1max} = \text{round}[2\pi(f_2-f_1)T_s]$, where $T_s$ is the measurement rate.

According to some embodiments of the present invention, the processing system is further configured for determining $M_0$ and $M_1$ by using the equation:

$$\Delta p_{mx} := \left| \text{floor}\left[ -\frac{f0 \cdot \phi 1 - f1 \cdot \phi 0 + 2 \cdot \pi \cdot \text{mod}(mx, Ma0) \cdot f0}{2\pi \cdot (f0 - f1)} \right] - \right.$$

-continued $$\left. \text{floor}\left[ -\frac{f0 \cdot \phi 2 - f2 \cdot \phi 0 + 2 \cdot \pi \cdot \text{floor}\left(\frac{mx}{Ma0}\right) \cdot f0}{2\pi \cdot (f0 - f2)} \right] \right|$$

In this case, the numbers $M_0$ and $M_1$ are determined by calculating integer numbers that satisfy the condition $\Delta p_{mx}=0$ for each mx selected from 0 to $(M_{0max} \cdot M_{1max})-1$, where $M_{0max} = \text{round}[2\pi(f_1-f_0)T_s]$ and where $M_{1max} = \text{round}[2\pi(f_2-f_1)T_s]$, where $T_s$ is the measurement rate, and $Ma0 = M_{0max}$ or $M_{1max}$.

According to some embodiments of the present invention, the processing system is configured to calculate $M_2$ by using the equation:

$$\frac{f_0\phi_1 - f_1\phi_0 + 2\pi M_0 f_0}{f_0 - f_1} = \frac{f_0\phi_3 - f_3\phi_0 + 2\pi M_2 f_0}{f_0 - f_3}$$

According to some embodiments of the present invention the processing system is further configured to determine kinematic data selected from velocity and acceleration of the object. The determination is based on the location data and system time T. For example, the kinematic data can be determined by taking time derivatives form the location data coordinates of the receiver mounted on the object.

According to some embodiments of the present invention, the processing system is configured to receive the phase data $\phi_i$ of each signal frequency component for each of the multi-frequency signals from the receiver system and to determine kinematic data based on the phase data $\phi_i$.

According to some embodiments of the present invention, the system includes three transmitting units, which are designated by letter symbols a, b and c. Thus, the transmitting units have coordinates $(x_a, y_a, z_a)$, $(x_b, y_b, z_b)$ and $(x_c, y_c, z_c)$, correspondingly.

In this case, determination of the location data includes calculating three location coordinates x(t), y(t) and z(t) of the object at time t, correspondingly. Accordingly, the processing system can be configured to determine the three location coordinates x(t), y(t) and z(t) of the object by using the equations:

$$D_a = \sqrt{(x(t)-x_a)^2 + (y(t)-y_a)^2 + (z(t)-z_a)^2}$$

$$D_b = \sqrt{(x(t)-x_b)^2 + (y(t)-y_b)^2 + (z(t)-z_b)^2}$$

$$D_c = \sqrt{(x(t)-x_c)^2 + (y(t)-y_c)^2 + (z(t)-z_c)^2}$$

where $D_a$, $D_b$ and $D_c$ are distances from the three transmitting units to the receiver system, correspondingly.

According to some embodiments of the present invention, the system includes four transmitting units, which are designated by letter symbols a, b, c and d. The transmitting units have coordinates $(x_a, y_a, z_a)$, $(x_b, y_b, z_b)$, $(x_c, y_c, z_c)$ and $(x_d, y_d, z_d)$, correspondingly.

In this case, the processing system is configured to determine the three location coordinates x(t), y(t) and z(t) of the object and the system time T by solving the following system of equations:

$$c(T-\Delta t_a) = \sqrt{(x(t)-x_a)_2 + (y(t)-y_a)_2 + (z(t)-z_a)^2}$$

$$c(T-\Delta t_b) = \sqrt{(x(t)-x_b)_2 + (y(t)-y_b)_2 + (z(t)-z_b)^2}$$

$$c(T-\Delta t_c) = \sqrt{(x(t)-x_c)_2 + (y(t)-y_c)_2 + (z(t)-z_c)^2}$$

$$c(T-\Delta t_d) = \sqrt{(x(t)-x_d)^2 + (y(t)-y_d)_2 + (z(t)-z_d)^2}$$

wherein T is the system time which is common to the four transmitting units and the receiver. In this system of equations, $c(T-\Delta t_a)$, $c(T-\Delta t_b)$, $c(T-\Delta t_c)$ and $c(T-\Delta t_d)$ are the distances between the transmitting unit and the receiver system mounted on the object, correspondingly.

According to another aspect of the present invention, there is provided a positioning method for determining location data of an object. The positioning method utilizes the system described above. The positioning method includes transmitting a multi-frequency signal which includes at least two different frequencies and measuring the phases of each signal frequency component of the multi-frequency signal. The positioning method also includes determining a distance D between the transmitting units and the object, and determining the location data of the object.

There has thus been outlined, rather broadly, the more important features of the invention in order that the detailed description thereof that follows hereinafter may be better understood. Additional details and advantages of the invention will be set forth in the detailed description, and in part will be appreciated from the description, or may be learned by practice of the invention.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

The principles and operation of the positioning system and method for determining location data of an object according to the present invention may be better understood with reference to the drawings and the accompanying description, it being understood that these drawings and examples in the description are given for illustrative purposes only and are not meant to be limiting. The same reference Roman numerals and alphabetic characters will be utilized for identifying those components which are common in the positioning system and its components shown in the drawings throughout the present description of the invention. It should be noted that the blocks in the drawings illustrating various embodiments of the present invention are intended as functional entities only, such that the functional relationships between the entities are shown, rather than any physical connections and/or physical relationships.

Some portions of the detailed descriptions, which follow hereinbelow, are presented in terms of algorithms and/or symbolic representations of operations on data represented as physical quantities within registers and memories of a computer system. An algorithm is here conceived to be a sequence of steps requiring physical manipulations of physical quantities and leading to a desired result. Usually, although not necessarily, these quantities take the form of electrical or magnetic signals capable of being stored, transferred, combined, compared, and otherwise manipulated. In the present description, these signals can be referred to as values, elements, symbols, terms, numbers, or the like.

Unless specifically stated otherwise, throughout the description, utilizing terms such as "computing" or "calculating" or "determining" or "obtaining" or the like, refer to the action and processes of a computer system, or similar electronic processing device, that manipulates and transforms data.

Figure 1:
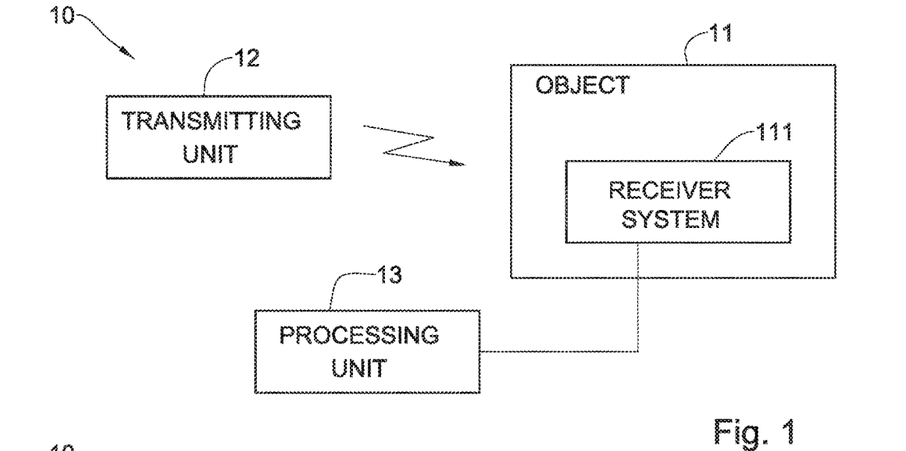
FIG. 1 illustrates a schematic block diagram of a positioning system, according to an embodiment of the present invention.

Referring to FIG. 1, a schematic block diagram of a positioning system 10 configured for determination of location data of an object 11 is illustrated, according to an embodiment of the present invention. The positioning system 10 includes a transmitting unit 12 and a receiver system 111 mounted on the object 11. According to this embodiment, the object 11 and the receiver system 111 constitute a unitary body.

The positioning system 10 also includes a processing system 13 in data communication with the receiver system 111. The processing system 13 communicates with the receiver system 111 via a communication network, using any known suitable wired and/or wireless communication techniques and data protocols.

According to an embodiment, the processing system 13 can be integrated with and be a part of the receiver system 111. Alternatively, the processing system 13 can be a stand-alone unit separate from the receiver system 111. When desired, the processing system 13 can include a display, printer and/or other monitoring devices (not shown).

In operation, the transmitting unit 12 is located at a certain distance D from the object 11. Generally, a positioning method for determining the distance D and the location data of the object 11 by using the positioning system 10 includes transmitting a multi-frequency signal comprising at least two different signal frequency components and measuring the phases of each signal frequency component of the multi-frequency signal. Then the processing system 13 calculates distance D between the transmitting unit 12 and the object 11, and the location data of the object 11.

According to an embodiment, the transmitting unit 12 is configured and operable for transmitting multi-frequency signals having a predetermined number L (at least two) of signal frequency components having frequencies f such that all the different signal frequency components are originated at the same time, where i is the number index of the signal frequency component, $i = 0, 1, \ldots, L$. The frequencies $f_i$ are selected from a predetermined set of frequencies.

The multi-frequency signal may be transmitted via the transmitting unit 12 with a certain time pattern, for example, as a sequence of periodic pulses, each pulse having a number L of signal frequency components. Alternatively, the multi-frequency signal may be a continuous signal having a number L of signal frequency components.

Upon arrival of the multi-frequency transmitted signal to the receiver system 111, each signal frequency component has a certain phase that can be measured. Accordingly, the receiver system 111 is configured and operable to receive the multi-frequency signals including the signal frequency components having frequencies $f_i$ originated from the transmitting unit 12, and to determine the phase $\phi_i$ of each signal frequency component of the multi-frequency signal at the time of arrival to the transmitting unit 12. To this end, the receiver system 111 includes a phase measuring unit 120, which is adapted to receive the signal frequency components as an input data and to measure the phase $\phi_i$ of each signal frequency component.

According to some embodiments of the present invention, the receiver system 111 is configured to receive multi-frequency signals provided by the transmitting unit 12, to analyze the multi-frequency signals and to determine a number L of the signal frequency components $f_i$ of each multi-frequency signal.

According to an embodiment of the present invention, the processing system 13 is in data communication with the receiver system 111, and is configured to receive the phase data $\phi_i$ of each signal frequency component of the multi-frequency signal provided by the phase measuring 120 unit, and to calculate the distance D between the transmitting unit 12 and the object 11.

According to an embodiment of the present invention, the receiver system 111 includes a time clock unit coupled to the phase measuring unit 120 for activation of measurements of the phases $\phi_i$ with a predetermined measurement rate $T_s$. The measurements of the phases $\phi_i$ can be carried out with a predetermined measurement rate $T_s$, that can, for example, be in the range of 10 microseconds to 100 microseconds.

In operation, upon receiving the phase data $\phi_i$ of each signal frequency component, the processing system 13 calculates the time of propagation $\Delta t$ of the multi-frequency signals from the transmitting unit 12 to the receiver system 111 mounted on the object 11.

According to an embodiment of the present invention, the time of propagation $\Delta t$ of the signal frequency components from the transmitting unit 12 to the receiver system 111 is determined by:

$$\Delta t = \frac{\phi_i + 2\pi N_i}{2\pi f_i}, \quad (1)$$

where $N_i$ is the number of wave cycles of an i-th signal frequency component spanned on the distance D between the transmitting unit 12 and the object 11. This number of cycles is denoted by $N_i = N_0 + M_i$, where $N_0$ is the number of cycles of the first signal frequency component and $M_i$ is the additive number to the number of cycles $N_0$ for the i-th signal frequency component.

Generally, the number of cycles $N_0$ of the first signal frequency component can be calculated by:

$$N_0 = \mathrm{floor}\left(\frac{2\pi f_0 dt - \phi_0}{2\pi}\right). \quad (2)$$

According to an embodiment of the present invention, the multi-frequency signal includes four signal frequency components having frequencies $f_0$, $f_1$, $f_2$, and $f_3$. In this case, $N_0$ which is a number of cycles of the first signal frequency component $f_0$ can be obtained by using any one of the following equations:

$$N_0 = -\frac{f_0 \phi_1 - f_1 \phi_0 + 2\pi M_0 f_0}{2\pi(f_0 - f_1)} \quad (3a)$$

$$N_0 = -\frac{f_0 \phi_2 - f_2 \phi_0 + 2\pi M_1 f_0}{2\pi(f_0 - f_2)} \quad (3b)$$

and $$N_0 = -\frac{f_0 \phi_3 - f_1 \phi_0 + 2\pi M_2 f_0}{2\pi(f_0 - f_3)}, \quad (3c)$$

where $M_0$, $M_1$, and $M_2$ are additives to the number of cycles $N_0$ for the signal frequency components having frequencies $f_1$, $f_2$, and $f_3$, correspondingly.

According to an embodiment of the present invention, for determination of the values of the additives $M_0$ and $M_1$, the processing system 13 executes the following algorithm.

The additives $M_0$ and $M_1$ are selected from 1 to their corresponding maximum value. Specifically, $M_0$ is selected from 0 to $(M_{0max}-1)$, where $M_{0max}=[2\pi(f_1-f_0)T_s]$ and $M_1$ is selected from 0 to $(M_{1max}-1)$, where $M_{1max}=[2\pi(f_2-f_1)T_s]$, where $T_s$ is the measurement rate.

The processing system 13 calculates integer values of $M_0$ and $M_1$ such that $M_0$ and $M_1$ satisfy the following equation:

$$\frac{f_0 \phi_1 - f_1 \phi_0 + 2\pi M_0 f_0}{f_0 - f_1} = \frac{f_0 \phi_2 - f_2 \phi_0 + 2\pi M_1 f_0}{f_0 - f_2} \quad (4)$$

According to another embodiment of the present invention, for determination of the values of the additives $M_0$ and $M_1$ by the processing system 13, the following relationship can be used:

$$\Delta p_{mx} := \left| \mathrm{floor}\left[-\frac{f0 \cdot \phi 1 - f1 \cdot \phi 0 + 2 \cdot \pi \cdot \mathrm{mod}(mx, Ma0) \cdot f0}{2\pi \cdot (f0 - f1)}\right] - \mathrm{floor}\left[-\frac{f0 \cdot \phi 2 - f2 \cdot \phi 0 + 2 \cdot \pi \cdot \mathrm{floor}\left(\frac{mx}{Ma0}\right) \cdot f0}{2\pi \cdot (f0 - f2)}\right] \right|. \quad (5)$$

In this case, the integer values of $M_0$ and $M_1$ can be selected so as to satisfy the condition $\Delta p_{mx}=0$. Specifically, mx can be selected from 0 to $(M_{0max} \cdot M_{1max})-1$, where $M_{0max}=\mathrm{round}[2\pi(f_1-f_0)T_s]$ and where $M_{1max}=\mathrm{round}[2\pi(f_2-f_1)T_s]$ and $T_s$ is the measurement rate and $Ma0=M_{0max}$ or $M_{1max}$.

After determining $M_0$ and $M_1$, the processing system 13 can calculate the additive $M_2$, for example, by solving the equation:

$$\frac{f_0 \phi_1 - f_1 \phi_0 + 2\pi M_0 f_0}{f_0 - f_1} = \frac{f_0 \phi_3 - f_3 \phi_0 + 2\pi M_2 f_0}{f_0 - f_3} \quad (6)$$

Accordingly, the additive $M_2$ can be calculated by:

$$M_2 = \frac{f_0 - f_3}{2\pi f_0(f_0 - f_1)}(f_0 \phi_1 - f_1 \phi_0 + 2\pi M_0 f_0) - \frac{f_0 \phi_3 + f_3 \phi_0}{2\pi f_0}. \quad (6a)$$

After determination of all the additives $M_0$, $M_1$, and $M_2$ the processing system 13 can determine $N_0$ and $\Delta t$ by using the abovementioned equations (3a)-(3c) and (1), accordingly.

Upon determination of the time of propagation $\Delta t$, the processing system 13 can determine the distance D between the transmitting unit 12 and the object 11 by using the equation $D = c \Delta t$, where c is the speed of propagation of the electromagnetic radiation.

The proposed technique has been checked by simulation for the multi-frequency signal including four signal frequency components satisfying the following relationships: $f_0=0.65$ GHz, $f_1-f_0=0.112$ MHz, $f_2-f_0=0.241$ MHz, $f_3-f_0=2.671$ MHz, and for the phases measured by the phase measuring unit 120 set to: $\phi_0=66.3745$ deg, $\phi_1=339.2858$ deg, $\phi_2=348.2641$ deg, and $\phi_3=40.1806$ deg.

In this example, the maximal values for the additives $M_0$, $M_1$ and $M_1$, calculated by the processing system 13 by using the algorithms described above and the equations (4) or (5) have been obtained as: $M_{0max}=30$, $M_{1max}=35$, $M_{2max}=685$. In turn, the number of the cycles $N_0$ of the first signal frequency component has been obtained as $N_0=1.0203\times10^4$. Accordingly, the calculated distance D between the transmitting unit 12 and the object 11 has been obtained as 158.18 km.

According to another aspect of the present technique, the processing system 13 is configured for determining location data of the object 11. This location data, in general, may include various parameters associated with three location coordinates (spatial coordinates) x(t), y(t) and z(t) of the object at time t and a system time T.

Figure 2:
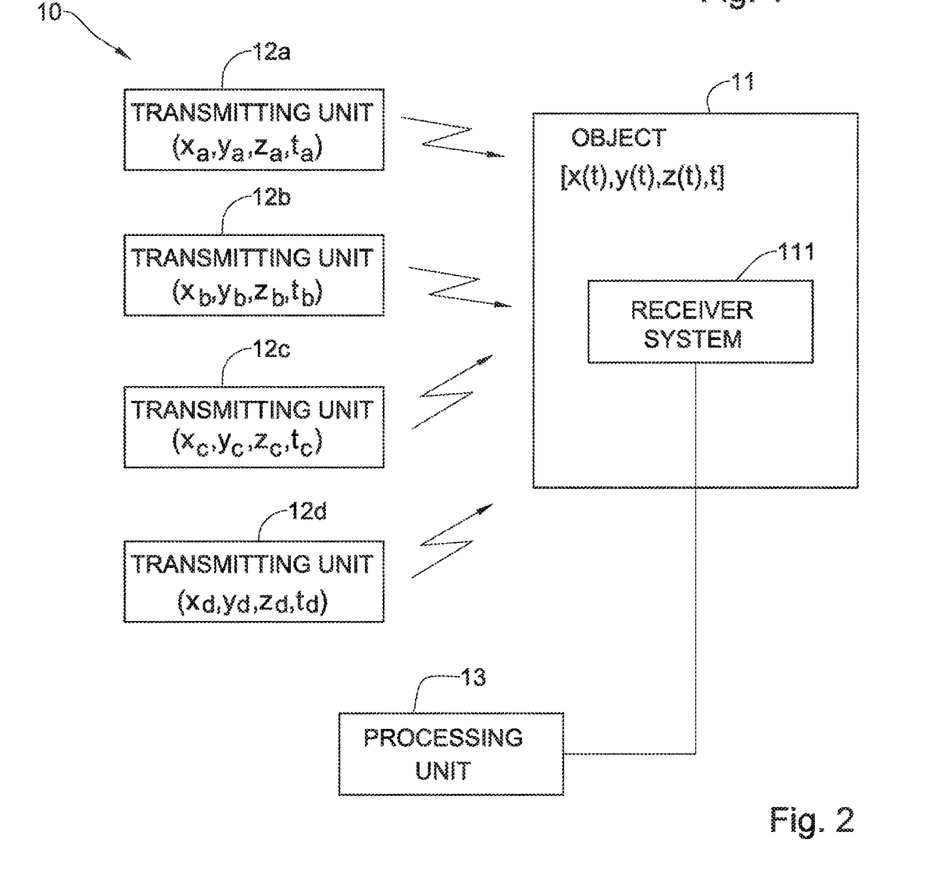
FIG. 2 illustrates a schematic block diagram of a positioning system, according to another embodiment of the present invention.

Referring to FIG. 2, a schematic block diagram of a positioning system 10 configured for determining location data of an object 11 is illustrated, according to an embodiment of the present invention. According to this embodiment, the positioning system 100 includes four transmitting units 12a-12d. Each transmitting unit has a predetermined location characterized by a set of corresponding spatial location coordinates. In particular, the transmitting unit 12a has coordinates $(x_a, y_a, z_a)$, the transmitting unit 12b has coordinates $(x_b, y_b, z_b)$, the transmitting unit 12c has coordinates $x_c, y_c, z_c)$ and the transmitting unit 12d has coordinates $(x_d, y_d, z_d)$. It should be noted that clocks of the transmitting units 12a-12d can be synchronized or unsynchronized with the clock of the receiver system 111. When the clocks of transmitting units 12a-12d are unsynchronized, each clock operates with its corresponding time $t_a$, $t_b$, $t_c$, and $t_d$, which is different from the time of the receiver system 111.

The positioning system 100 also includes a receiver system 111 mounted on the object 11 having location coordinates (x(t), y(t), z(t)) at time t.

Each of the transmitting units 12a-12d transmits a multi-frequency signal having a predetermined number L (at least two) of signal frequency components.

The receiver system 111 is configured to determine the phase data $\phi_i$ of each signal frequency component for each of the multi-frequency signals upon receiving the multi-frequency signals from all the transmitting units 12a-12d.

The positioning system 100 also includes a processing system 13 configured to receive the phase data $\phi_i$ of each signal frequency component for each of the multi-frequency signals from the receiver system 111, and to determine distances $D_a$, $D_b$, $D_c$ and $D_d$ from each transmitting unit 12a, 12b, 12c and 12d to the object 11, correspondingly.

Once the distances $D_a$, $D_b$, $D_c$ and $D_d$ are determined, the processing system 13 can calculate the location data coordinates (x(t), y(t), z(t)) of the receiver 111 mounted on the object 11, and when desired can also be synchronized by determining the system time T.

Accordingly, the processing system 13 can be configured for determining the system time T by solving the following system of equations:

$$c(T-\Delta t_a)=\sqrt{(x(t)-x_a)^2+(y(t)-y_a)_2+(z(t)-z_a)^2} \tag{7a}$$

$$c(T-\Delta t_b)=\sqrt{(x(t)-x_b)^2+(y(t)-y_b)_2+(z(t)-z_b)^2} \tag{7b}$$

$$c(T-\Delta t_c)=\sqrt{(x(t)-x_c)^2+(y(t)-y_c)_2+(z(t)-z_c)^2} \tag{7c}$$

$$c(T-\Delta t_d)=\sqrt{(x(t)-x_d)^2+(y(t)-y_d)_2+(z(t)-z_d)^2} \tag{7d}$$

where $c(T-\Delta t_a)$, $c(T-\Delta t_b)$, $c(T-\Delta t_c)$ and $c(T-\Delta t_d)$ are the distances between the receiver system 111 mounted on the object 11 and the transmitting units 12a, 12b, 12c, and 12d, correspondingly.

It should be understood that the number of transmitting units can be selected in accordance with the number K of unknown location parameters of the system.

When desired, the processing system 13 is further configured for determining kinematic data indicative of velocity and acceleration of the object. The determining is based on the location data of the receiver 111 and the system time T. The kinematic data may, for example, be determined by taking time derivatives form the location data coordinates (x(t), y(t), z(t)) of the receiver 111 mounted on the object 11.

In the cases where the system time T cannot be determined directly (e.g. clocks of the transmitters are not synchronized with the clock of the receiver system 111), the processing system 13 is configured for receiving the phase data $\phi_i$ of each signal frequency component for each of the multi-frequency signals from the receiver system 111 and determining kinematic data based on the phase data $\phi_i$.

More specifically, the processing system 13 is configure for determining distances and kinematic data in accordance with phase difference of each signal frequency component for each of the multi-frequency signals. The phase difference is measured with a predetermined measurement rate $T_s$, thereby the distance D between each transmitting unit and the object and kinematic data can be determined at each time t.

It should be noted that when the system is not synchronized (i.e. clocks of the transmitters are not synchronized with the clock of the receiver system 111), a pseudo-range is determined for each transmitting unit. Such a pseudo-range does not provide the accurate distance between the transmitting unit and the object, however, changes in location of the object (due to the object motion) can still be determined accurately. Upon determining the distance D for each time t, the kinematic data can be determined.

Figure 3:
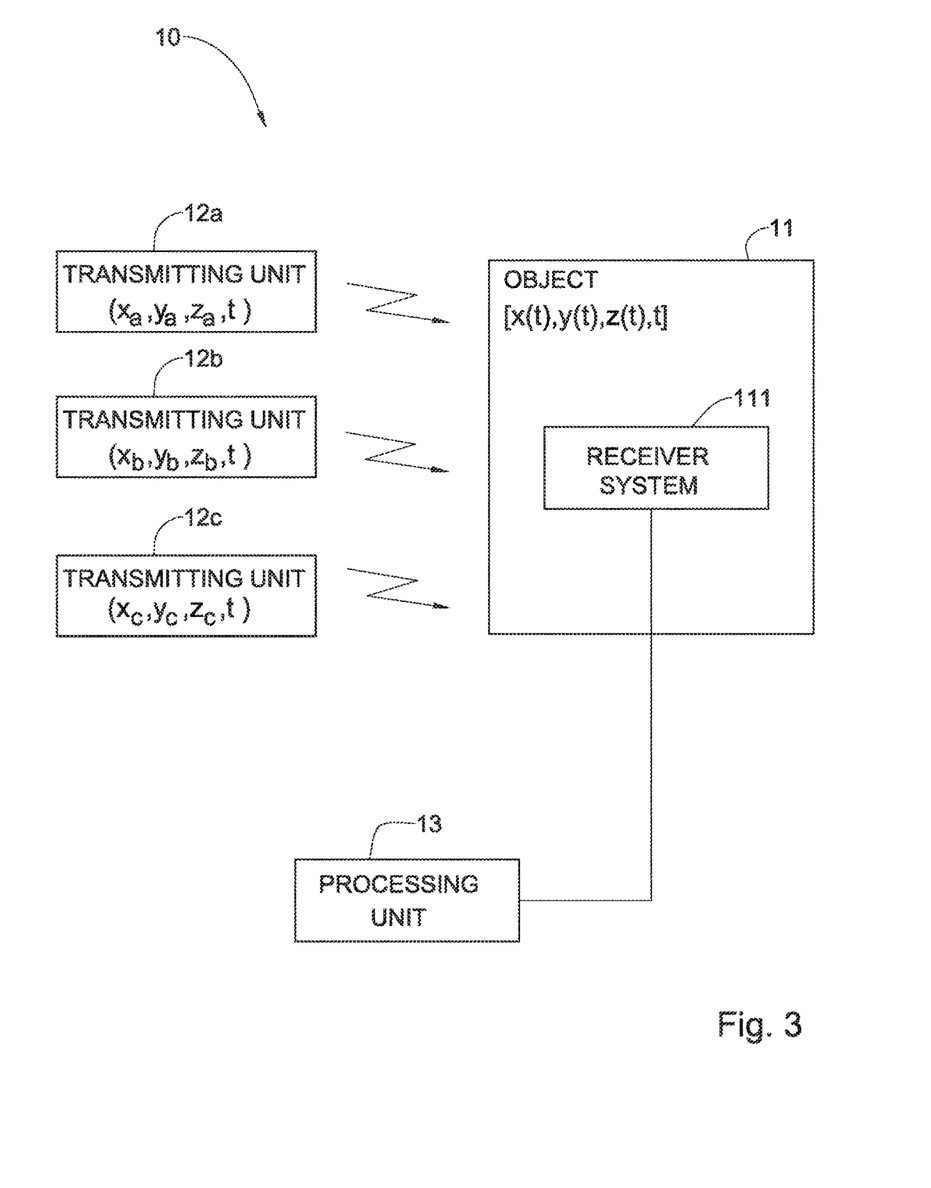
FIG. 3 illustrates a schematic block diagram of a positioning system, according to a further embodiment of the present invention.

Referring to FIG. 3, a schematic block diagram of a positioning system 100 is illustrated, according to an embodiment of the present invention.

For example, as shown in FIG. 3, if the system time T is known, while three other location parameters, (such as location data coordinates (x(t), y(t), z(t)) of the receiver 111 mounted on the object 11) are unknown, the positioning system 100 includes three transmitting units 12a, 12b and 12c. Each transmitting unit has a certain location characterized by a set of corresponding spatial location coordinates. Specifically, the transmitting unit 12a has coordinates $(x_a, y_a, z_a)$, the transmitting unit 12b has coordinates $(x_b, y_b, z_b)$, and the transmitting unit 12c has coordinates $(x_c, y_c, z_c)$.

Accordingly, the processing system 13 can be configured to determine these three location coordinates x(t), y(t) and z(t) of the object by solving the system of the equations:

$$D_a=\sqrt{(x(t)-x_a)^2+(y(t)-y_a)^2+(z(t)-z_a)^2} \tag{8a}$$

$$D_b=\sqrt{(x(t)-x_b)^2+(y(t)-y_b)^2+(z(t)-z_b)^2} \tag{8b}$$

$$D_c=\sqrt{(x(t)-x_c)^2+(y(t)-y_c)^2+(z(t)-z_c)^2} \tag{8c}$$

where $D_a$, $D_b$ and $D_c$ are the distances between the object 11 mounted on the receiver system 13 and the transmitting units 12a, 12b and 12c, correspondingly, that can be obtained as described herein above.

In the case, when one of the location data coordinates (x(t), y(t), z(t)) is known, for example a moving car or a ship, where the altitude z(t) is known and does not change, only two of the transmitting units (for example, transmitting units 12a, 12b) are needed to determine the two remaining data coordinates (x(t), y(t)).

Accordingly, the processing system 13 can be configured to determine these two location coordinates x(t) and y(t) of the object by solving the system of the equations:

$$D_a = \sqrt{(x(t)-x_a)^2+(y_a)^2+(z(t)-z_a)^2} \quad (8d)$$

$$D_b = \sqrt{(x(t)-x_b)^2+(y_b)^2+(z(t)-z_b)^2} \quad (8e)$$

As such, those skilled in the art to which the present invention pertains, can appreciate that while the present invention has been described in terms of preferred embodiments, the concept upon which this disclosure is based may readily be utilized as a basis for the designing of other structures, systems and processes for carrying out the several purposes of the present invention.

Also, it is to be understood that the phraseology and terminology employed herein are for the purpose of description and should not be regarded as limiting.

Finally, it should be noted that the word "comprising" as used throughout the appended claims is to be interpreted to mean "including but not limited to".

It is important, therefore, that the scope of the invention is not construed as being limited by the illustrative embodiments set forth herein. Other variations are possible within the scope of the present invention as defined in the appended claims. Other combinations and sub-combinations of features, functions, elements and/or properties may be claimed through amendment of the present claims or presentation of new claims in this or a related application. Such amended or new claims, whether they are directed to different combinations or directed to the same combinations, whether different, broader, narrower or equal in scope to the original claims, are also regarded as included within the subject matter of the present description.

The invention claimed is:

1. A positioning system for determination of location data of an object comprising:
   at least one transmitting unit configured to transmit a multi-frequency signal comprising at least two different signal frequency components;
   a receiver system mounted on the object and configured to receive the multi-frequency signals from said at least one transmitting unit, and to determine phases of each signal frequency component of the multi-frequency signal; and
   a processing system being in data communication with the receiver system, and configured to receive the phases of each signal frequency component of the multi-frequency signal, and to determine a distance D between said at least one transmitting unit and the object, and the location data of the object;
   wherein the receiver system is configured for:
   receiving the multi-frequency signals provided by said at least one transmitting unit;
   analyzing the multi-frequency signals, wherein the multi-frequency signal includes a sum of a predetermined number L of signal frequency components $f_i$, where i is a number index of the signal frequency components, i=1, 2, ..., L; wherein the signal frequency components $f_i$ are mutually prime numbers; and
   determining said number L of the signal frequency components $f_i$ of each of said multi-frequency signals;
   wherein the distance D between said at least one transmitting unit and the object is determined by D=cΔt, where c is the light speed, and Δt is the time of propagation of the multi-frequency signals between said at least one transmitting unit and the object, the time is determined from an equation:

$$\Delta t = \frac{\phi_i + 2\pi N_i}{2\pi f_i}$$

where $\phi_i$ is the phase of an i-th signal frequency component determined by the receiver system, $N_i$ is a number of wave cycles of an i-th signal frequency component spanned on the distance D, and where a number i of the signal frequency component $f_i$ is selected from 0, 1, 2 and 3.

2. The positioning system of claim 1, wherein a number of the signal frequency components $f_i$ transmitted by said at least one transmitting unit is four, $f_0$, $f_1$, $f_2$, and $f_3$, and wherein the processing system is configured for determining a number $N_0$ of cycles of the first signal frequency component $f_0$ by using any one of the following equations:

$$N_0 = -\frac{f_0\phi_1 - f_1\phi_0 + 2\pi M_0 f_0}{2\pi(f_0 - f_1)}$$

$$N_0 = -\frac{f_0\phi_2 - f_2\phi_0 + 2\pi M_1 f_0}{2\pi(f_0 - f_2)}$$

and $$N_0 = -\frac{f_0\phi_3 - f_1\phi_0 + 2\pi M_2 f_0}{2\pi(f_0 - f_3)},$$

where $M_0$, $M_1$, and $M_2$ are additives to the number of cycles $N_0$ for the signal frequency components $f_1$, $f_2$, $f_3$, correspondingly.

3. The positioning system of claim 2, wherein $M_0$ and $M_1$ are determined by using the following algorithm:
   for each $M_0$ selected from 0 to ($M_{0max}-1$) and for each $M_1$ selected from 0 to ($M_{1max}-1$), the processing system calculates integer numbers corresponding to $M_0$ and $M_1$ so as to satisfy an equation:

$$\frac{f_0\phi_1 - f_1\phi_0 + 2\pi M_0 f_0}{f_0 - f_1} = \frac{f_0\phi_2 - f_2\phi_0 + 2\pi M_1 f_0}{f_0 - f_2},$$

where $M_{0max}$=round $[2\pi(f_1-f_0)T_s]$ and where $M_{1max}=[2\pi(f_2-f_1)T_s]$ where $T_s$ is the measurement rate.

4. The positioning system of claim 2, wherein $M_0$ and $M_1$ are determined from an equation:

$$\Delta p_{mx} := \left| \text{floor}\left[-\frac{f0\cdot\phi 1 - f1\cdot\phi 0 + 2\cdot\pi\cdot\text{mod}(mx, Ma0)\cdot f0}{2\pi\cdot(f0-f1)}\right] - \text{floor}\left[-\frac{f0\cdot\phi 2 - f2\cdot\phi 0 + 2\cdot\pi\cdot\text{floor}\left(\frac{mx}{Ma0}\right)\cdot f0}{2\pi\cdot(f0-f2)}\right] \right|$$

by calculating integer numbers satisfying a condition $\Delta p_{mx}=0$ for each mx selected from 0 to $(M_{0max} \cdot M_{1max})-1$, where $M_{0max}=\text{round}[2\pi(f_1-f_0)T_s]$ and where $M_{1max}=\text{round}[2\pi(f_2f_1)T_s]$ where $T_s$ is the measurement rate, and $Ma0=M_{0max}$ or $M_{1max}$.

5. The positioning system of claim 3, wherein the processing system is configured to calculate $M_2$ by solving an equation:

$$\frac{f_0\phi_1 - f_1\phi_0 + 2\pi M_0 f_0}{f_0 - f_1} = \frac{f_0\phi_3 - f_3\phi_0 + 2\pi M_2 f_0}{f_0 - f_3}.$$

6. The positioning system of claim 4, wherein the processing system is configured to calculate $M_2$ by solving an equation:

$$\frac{f_0\phi_1 - f_1\phi_0 + 2\pi M_0 f_0}{f_0 - f_1} = \frac{f_0\phi_3 - f_3\phi_0 + 2\pi M_2 f_0}{f_0 - f_3}.$$

7. The positioning system of claim 1, wherein the processing system is further configured to receive the phase data $\phi_i$ of each signal frequency component for each of the multi-frequency signals from the receiver system, and to determine kinematic data based on the phase data $\phi_i$, said kinematic data selected from velocity and acceleration of the object.

8. A positioning for determination of location data of an object comprising:
at least one transmitting unit configured to transmit a multi-frequency signal comprising at least two different signal frequency components;
a receiver system mounted on the object and configured to receive the multi-frequency signals from said at least one transmitting unit, and to determine phases of each signal frequency component of the multi-frequency signal; and
a processing system being in data communication with the receiver system, and configured to receive the phases of each signal frequency component of the multi-frequency signal, and to determine a distance D between said at least one transmitting unit and the object, and the location data of the object;
wherein the receiver system is configured for:
receiving the multi-frequency signals provided by said at least one transmitting unit;
analyzing the multi-frequency signals, wherein the multi-frequency signal includes a sum of a predetermined number L of signal frequency components $f_i$, where i is a number index of the signal frequency components, i=1, 2, . . . , L; wherein the signal frequency components $f_i$ are mutually prime numbers; and
determining said number L of the signal frequency components $f_i$ of each of said multi-frequency signals;
wherein the positioning system comprises three transmitting units having coordinates $(x_a, y_a, z_a)$, $(x_b, y_b, z_b)$ and $(x_c, y_c, z_c)$, correspondingly, and the determination of the location data includes calculating three location coordinates x(t), y(t) and z(t) of the object at time t; and
wherein the processing system is configured to determine the three location coordinates x(t), y(t) and z(t) of the object (11) by using the following equations:

$$D_a = \sqrt{(x(t)-x_a)^2+(y(t)-y_a)^2+(z(t)-z_a)^2}$$

$$D_b = \sqrt{(x(t)-x_b)^2+(y(t)-y_b)^2+(z(t)-z_b)^2}$$

$$D_c = \sqrt{(x(t)-x_c)^2+(y(t)-y_c)^2+(z(t)-z_c)^2}$$

where $D_a$, $D_b$ and $D_c$ are distances from said three transmitting units to the receiver system, correspondingly.

9. A positioning system for determination of location data of an object comprising:
at least one transmitting unit configured to transmit a multi-frequency signal comprising at least two different signal frequency components;
a receiver system mounted on the object and configured to receive the multi-frequency signals from said at least one transmitting unit, and to determine phases of each signal frequency component of the multi-frequency signal; and
a processing system being in data communication with the receiver system, and configured to receive the phases of each signal frequency component of the multi-frequency signal, and to determine a distance D between said at least one transmitting unit and the object, and the location data of the object;
wherein the receiver system is configured for:
receiving the multi-frequency signals provided by said at least one transmitting unit;
analyzing the multi-frequency signals, wherein the multi-frequency signal includes a sum of a predetermined number L of signal frequency components $f_i$, where i is a number index of the signal frequency components, i=1, 2, . . . , L; wherein the signal frequency components $f_i$ are mutually prime numbers; and
determining said number L of the signal frequency components $f_i$ of each of said multi-frequency signals;
wherein the positioning system comprises four transmitting units having coordinates $(x_a, y_a, z_a)$, $(x_b, y_b, z_b)$, $(x_c, y_c, z_c)$ and $(x_d, y_d, Z_a)$, correspondingly, and
wherein the processing system is configured to determine three location coordinates x(t), y(t) and z(t) of the object and system time T by solving the following system of equations:

$$c(T-\Delta t_a) = \sqrt{(x(t)-x_a)^2+(y(t)-y_a)^2+(z(t)-z_a)^2}$$

$$c(T-\Delta t_b) = \sqrt{(x(t)-x_b)^2+(y(t)-y_b)^2+(z(t)-z_b)^2}$$

$$c(T-\Delta t_c) = \sqrt{(x(t)-x_c)^2+(y(t)-y_c)^2+(z(t)-z_c)^2}$$

$$c(T-\Delta t_d) = \sqrt{(x(t)-x_d)^2+(y(t)-y_d)^2+(z(t)-z_d)^2}$$

where T is the system time which is common to said four transmitting units, and where $c(T-\Delta t_a)$, $c(T-\Delta t_b)$, $c(T-\Delta t_c)$ and $c(T-\Delta t_d)$ are the distances between said transmitting units and said receiver system mounted on the object, correspondingly.

10. A positioning method for determining location data of an object, comprising:
providing the positioning system of claim 1;
transmitting a multi-frequency signal comprising at least two different frequencies;
measuring the phases of each signal frequency component of the multi-frequency signal; and
determining a distance D between said at least one transmitting unit and the object, and the location data of the object;
wherein the receiver system of the positioning system is configured for:
receiving the multi-frequency signals provided by said at least one transmitting unit;
analyzing the multi-frequency signals, wherein the multi-frequency signal includes a sum of a predetermined number L of signal frequency components $f_i$, where i is a number index of the signal frequency components, i=1, 2, ..., L; wherein the signal frequency components $f_i$ are mutually prime numbers; and determining said number L of the signal frequency components $f_i$ of each of said multi-frequency signals;

wherein the distance D between said at least one transmitting unit and the object is determined by $D=c\Delta t$, where c is the light speed, and $\Delta t$ is the time of propagation of the multi-frequency signals between said at least one transmitting unit and the object, the time is determined from an equation:

$$\Delta t = \frac{\phi_i + 2\pi N_i}{2\pi f_i}$$

where $\phi_i$ is the phase of an i-th signal frequency component determined by the receiver system, and $N_i$ is a number of wave cycles of an i-th signal frequency component spanned on the distance D, and where a number i of the signal frequency component $f_i$ is selected from 0, 1, 2 and 3.

11. The positioning method of claim 10, wherein a number of the signal frequency components $f_i$ transmitted by said at least one transmitting unit is four, $f_0$, $f_1$, $f_2$, and $f_3$, and wherein the method includes determining a number $N_0$ of cycles of the first signal frequency component $f_0$ by using any one of the equations:

$$N_0 = -\frac{f_0\phi_1 - f_1\phi_0 + 2\pi M_0 f_0}{2\pi(f_0 - f_1)}$$

$$N_0 = -\frac{f_0\phi_2 - f_2\phi_0 + 2\pi M_1 f_0}{2\pi(f_0 - f_2)}$$

and $$N_0 = -\frac{f_0\phi_3 - f_1\phi_0 + 2\pi M_2 f_0}{2\pi(f_0 - f_3)}$$

where $M_0$, $M_1$, and $M_2$ are additives to the number of cycles $N_0$ for the signal frequency components $f_1$, $f_2$, $f_3$, correspondingly.

12. The positioning method of claim 11, comprising determining $M_0$ and $M_1$ by using the following algorithm:

for each $M_0$ selected from 0 to ($M_{0max}-1$) and for each $M_1$ selected from 0 to ($M_{1max}-1$), calculating, by the processing system, integer numbers corresponding to $M_0$ and $M_1$, which satisfy an equation:

$$\frac{f_0\phi_1 - f_1\phi_0 + 2\pi M_0 f_0}{f_0 - f_1} = \frac{f_0\phi_2 - f_2\phi_0 + 2\pi M_1 f_0}{f_0 - f_2}$$

where $M_{0max}=\text{round}[2\pi(f_1-f_0)T_s]$ and where $M_{1max}=[2\pi(f_2-f_0)T_s]$ where $T_s$ is the measurement rate.

13. The positioning method of claim 11, comprising determining $M_0$ and $M_1$ from an equation:

$$\Delta p_{mx} := \left| \text{floor}\left[ -\frac{f0 \cdot \phi 1 - f1 \cdot \phi 0 + 2 \cdot \pi \cdot \text{mod}(mx, Ma0) \cdot f0}{2\pi \cdot (f0 - f1)} \right] - \text{floor}\left[ -\frac{f0 \cdot \phi 2 - f2 \cdot \phi 0 + 2 \cdot \pi \cdot \text{floor}\left(\frac{mx}{Ma0}\right) \cdot f0}{2\pi \cdot (f0 - f2)} \right] \right|$$

by calculating integer numbers satisfying a condition $\Delta p_{mx}=0$ for each mx selected from 0 to $(M_{0max} \cdot M_{1max})-1$, where $M_{0max}=\text{round}[2\pi(f_1-f_0)T_s]$ and where $M_{1max}=\text{round}[2\pi(f_2-f_1)T_s]$ where $T_s$ is the measurement rate, and $Ma0=M_{0max}$ or $M_{1max}$.

14. The positioning method of claim 12, comprising calculating $M_2$ by solving an equation:

$$\frac{f_0\phi_1 - f_1\phi_0 + 2\pi M_0 f_0}{f_0 - f_1} = \frac{f_0\phi_3 - f_3\phi_0 + 2\pi M_2 f_0}{f_0 - f_3}.$$

15. The positioning method of claim 13, comprising calculating $M_2$ by solving an equation:

$$\frac{f_0\phi_1 - f_1\phi_0 + 2\pi M_0 f_0}{f_0 - f_1} = \frac{f_0\phi_3 - f_3\phi_0 + 2\pi M_2 f_0}{f_0 - f_3}.$$

16. The positioning method of claim 10, wherein determining of kinematic data includes receiving the phase data $\phi_i$ of each signal frequency component for each of the multi-frequency signals from the receiver system and to determining the kinematic data based on the phase data $\phi_i$, said kinematic data selected from velocity and acceleration of the object.

17. A positioning method for determining location data of an object, comprising:

providing a positioning system for determination of location data of an object comprising:

at least one transmitting unit configured to transmit a multi-frequency signal comprising at least two different signal frequency components;

a receiver system mounted on the object and configured to receive the multi-frequency signals from said at least one transmitting unit, and to determine phases of each signal frequency component of the multi-frequency signal; and a processing system being in data communication with the receiver system, and configured to receive the phases of each signal frequency component of the multi-frequency signal, and to determine a distance D between said at least one transmitting unit and the object, and the location data of the object;

wherein the receiver system is configured for:

receiving the multi-frequency signals provided by said at least one transmitting unit;

analyzing the multi-frequency signals, wherein the multi-frequency signal includes a sum of a predetermined number L of signal frequency components fi, where i is a number index of the signal frequency components, i=1, 2, ..., L; wherein the signal frequency components fi are mutually prime numbers; and determining said number L of the signal frequency components fi of each of said multi-frequency signals;

transmitting a multi-frequency signal comprising at least two different frequencies;

measuring the phases of each signal frequency component of the multi-frequency signal; and determining a distance D between said at least one transmitting unit and the object, and the location data of the object;

wherein the positioning system comprises three transmitting units having coordinates $(x_a, y_a, z_a)$, $(x_b, y_b, z_b)$ and $(x_c, y_c, z_c)$, correspondingly, the method includes determining location data, and includes calculating three location coordinates $x(t)$, $y(t)$ and $z(t)$ of the object at time t, correspondingly; and wherein the processing system of the positioning system is configured to determine the three location coordinates $x(t)$, $y(t)$ and $z(t)$ of the object by using equations:

$$D_a = \sqrt{(x(t)-x_a)^2+(y(t)-y_a)^2+(z(t)-z_a)^2}$$

$$D_b = \sqrt{(x(t)-x_b)^2+(y(t)-y_b)^2+(z(t)-z_b)^2}$$

$$D_c = \sqrt{(x(t)-x_c)^2+(y(t)-y_c)^2+(z(t)-z_c)^2},$$

where $D_a$, $D_b$ and $D_c$ are distances from said three transmitting units to the receiver system, correspondingly.

18. A positioning method for determining location data of an object, comprising:
  providing a positioning system for determination of location data of an object comprising:
    at least one transmitting unit configured to transmit a multi-frequency signal comprising at least two different signal frequency components;
    a receiver system mounted on the object and configured to receive the multi-frequency signals from said at least one transmitting unit, and to determine phases of each signal frequency component of the multi-frequency signal; and
    a processing system being in data communication with the receiver system, and configured to receive the phases of each signal frequency component of the multi-frequency signal, and to determine a distance D between said at least one transmitting unit and the object, and the location data of the object;
  wherein the receiver system is configured for:
  receiving the multi-frequency signals provided by said at least one transmitting unit;
  analyzing the multi-frequency signals, wherein the multi-frequency signal includes a sum of a predetermined number L of signal frequency components fi, where i is a number index of the signal frequency components, i=1, 2, . . . , L; wherein the signal frequency components fi are mutually prime numbers; and
  determining said number L of the signal frequency components fi of each of said multi-frequency signals;
  transmitting a multi-frequency signal comprising at least two different frequencies;
  measuring the phases of each signal frequency component of the multi-frequency signal; and
  determining a distance D between said at least one transmitting unit and the object, and the location data of the object;
  wherein the positioning system comprises four transmitting units having coordinates $(x_a, y_a, z_a)$, $(x_b, y_b, z_b)$, $(x_c, y_c, z_c)$ and $(x_d, y_d, Z_d)$, correspondingly, the method includes determining location data and system time T; and
  wherein the processing system of the positioning system is configured to determine the three location coordinates $x(t)$, $y(t)$ and $z(t)$ of the object and the system time T by solving the following system of equations:

$$c(T-\Delta t_a) = \sqrt{(x(t)-x_a)^2+(y(t)-y_a)^2+(z(t)-z_a)^2}$$

$$c(T-\Delta t_b) = \sqrt{(x(t)-x_b)^2+(y(t)-y_b)^2+(z(t)-z_b)^2}$$

$$c(T-\Delta t_c) = \sqrt{(x(t)-x_c)^2+(y(t)-y_c)^2+(z(t)-z_c)^2}$$

$$c(T-\Delta t_d) = \sqrt{(x(t)-x_d)^2+(y(t)-y_d)^2+(z(t)-z_d)^2},$$

wherein T is the system time which is common to said four transmitting units, and where $c(T-\Delta t_a)$, $c(T-\Delta t_b)$, $c(T-\Delta t_c)$ and $c(T-\Delta t_d)$ are the distances between said transmitting unit and said receiver system mounted on the object, correspondingly.

* * * * *